United States Patent [19]

Gerber

[11] Patent Number: 5,760,104

[45] Date of Patent: Jun. 2, 1998

[54] MIXTURES OF PHENOLIC NOVOLAKS FOR USE WITH REFRACTORY AGGREGATE AND METHODS FOR MAKING SAME

[75] Inventor: Arthur Harry Gerber, Louisville, Ky.

[73] Assignee: Borden Chemical, Inc., Columbus, Ohio

[21] Appl. No.: 890,202

[22] Filed: Jul. 9, 1997

Related U.S. Application Data

[62] Division of Ser. No. 416,192, Apr. 4, 1995, Pat. No. 5,686,506.

[51] Int. Cl.$^6$ ............... B22C 1/22; C08F 283/00; B32B 5/16

[52] U.S. Cl. ............... 523/145; 525/486; 525/488; 525/489; 525/495; 525/497; 525/503; 525/504; 525/534; 525/540; 524/841; 524/843; 524/847; 523/139; 523/146; 523/147; 522/1; 428/404; 428/407

[58] Field of Search ............... 525/486, 488, 525/489, 495, 497, 503, 504, 534, 540; 524/841, 843, 847; 523/139, 143, 146, 147; 522/1; 428/404, 407

[56] References Cited

U.S. PATENT DOCUMENTS

| | | | |
|---|---|---|---|
| 3,116,522 | 1/1964 | Taylor et al. | 164/361 |
| 4,022,739 | 5/1977 | Bove | 523/140 |
| 4,740,535 | 4/1988 | Iyer et al. | 523/145 |
| 4,795,725 | 1/1989 | Addink et al. | 501/101 |
| 4,877,761 | 10/1989 | Chmiel et al. | 501/109 |
| 5,179,177 | 1/1993 | Gerber | 525/506 |
| 5,218,010 | 6/1993 | Gerber | 523/145 |
| 5,243,015 | 9/1993 | Hutchings et al. | 528/129 |
| 5,294,649 | 3/1994 | Gerber | 523/145 |

FOREIGN PATENT DOCUMENTS

| | | |
|---|---|---|
| 0087825A | 9/1983 | European Pat. Off. |
| 5372022 | 6/1978 | Japan. |
| 59-207869A | 11/1984 | Japan. |
| 2131789 | 6/1984 | United Kingdom. |
| 9217419 | 10/1992 | WIPO. |

*Primary Examiner*—Samuel A. Acquah
*Attorney, Agent, or Firm*—Watson Cole Stevens Davis, P.L.L.C.

[57] ABSTRACT

A binder solution of a phenolic novolak resin in solvent, preferably furfuryl alcohol containing at least one chemical agent such as amines containing one to five, preferably two to four, nitrogen atoms, glycerine or mixtures thereof. Preferably, the binder solution contains about 0.2 to about 1.5 weight percent water. The binder solution is for binding refractory objects, preferably those containing doloma (calcined dolomite) aggregate. Methods of mixing these ingredients and using the mixture are also disclosed. Bricks made from the doloma aggregate mixed with the binder solution show good ambient temperature green strength and enhanced modulus of rupture after curing and coking.

24 Claims, No Drawings

MIXTURES OF PHENOLIC NOVOLAKS FOR USE WITH REFRACTORY AGGREGATE AND METHODS FOR MAKING SAME

This is a division of application Ser. No. 08/416,192, filed Apr. 4, 1995 now U.S. Pat. No. 5,686,506.

BACKGROUND OF THE INVENTION

The present invention relates to methods and compositions useful in the manufacture and use of refractory compositions. More particularly, this invention relates to methods and compositions for providing a binder for doloma, wherein the binder employs low levels of water by substituting a chemical agent for water. The binder is mixed with a doloma (calcined dolomite) aggregate to form a green compressed body having good green strength prior to curing and coking, and superior strength after curing and coking, relative to prior art doloma compositions.

Dolomite, $CaMg(CO_3)_2$, occurs in widespread deposits in many areas including southern Austria, the UK, the USSR, and the United States. Raw dolomite may be used for certain refractories, but in most instances it is calcined to form a grain consisting primarily of MgO (periclase) and CaO.

Dolomite refractories contain calcined (e.g., hard burned or dead burned) dolomite (doloma) and possibly fluxes such as millscale, serpentine, or clay. Shaped refractories may be bonded or impregnated with pitch to improve slag resistance and inhibit hydration. Addition of magnesite gives magnesite-dolomite or magdol refractories. Dolomite refractories are primarily used in linings of basic oxygen furnace (BOF) vessels, refining vessels, ladles and cement kilns.

One use of doloma is as a material for refractory brick. The standard dimensions of a refractory brick are 23 cm long by 11.4 cm wide and 6.4 cm thick (straight brick). Quantities of bricks are given in brick equivalents, that is, the number of standard 23-cm (9-in.) bricks with a volume equal to that of the particular installation. The actual shape and size of bricks depends upon the design of the vessel or structure in question and may vary considerably from the standard 23-cm straight brick. For example, bricks for basic oxygen furnaces (BOF vessels) may be in the shape of a key 65.6 cm long, 7.6 cm thick, and tapering in width from 15.2–10.2 cm. Numerous other shapes are available from manufacturers as standard items as well as custom made or special ordered shapes. Bricks may be extruded or dry-pressed on mechanical or hydraulic presses and subsequently coked (calcined).

Coal tar pitch has been conventionally used as a binder for doloma refractory articles. However, because of potential health hazards in the handling of pitch and the evolution hazards of pyrolysis products, there is a tendency to use polymers to replace pitch. Phenolic resins, both novolaks and resoles are favored because they are or can become thermosetting and because they can be pyrolysed during coking to achieve a high carbon yield.

Conventional binders employed for binding doloma are made of novolak resin in a solvent and typically contain 2 to 3 weight percent water. The water comes from being present in other ingredients, e.g., solvent, of the binder and/or is added. It was believed that water levels of 2 to 3 weight percent assist in development of green strength of the doloma brick. However, water also accelerates low temperature hardening of doloma. This level of water is a compromise of the properties of green strength and mix life. Lower levels of water decrease green strength of ambient temperature pressed doloma/resin brick. Higher levels of water decrease the mix life of the brick mix. That is, the higher levels of water cause the brick mix to harden too fast. It would be desirable to provide a resin binder which provides high levels of mix life and green strength for pressed doloma brick.

Moreover, is likely that water in contact with doloma is ultimately converted to calcium hydroxide $(Ca(OH)_2)$. The calcium hydroxide subsequently decomposes to generate lime and water vapor at about 580° and higher during coking of the bound doloma. The release of the water vapor during coking may weaken the doloma brick by forming microcracks. Thus, the calcium hydroxide resulting from the high water levels, of 2 to 3 weight percent water, reduces the modulus of rupture after coking of the doloma brick. It would be desirable to provide a binder for doloma brick which minimizes formation of such microcracks and results in a strong cured and coked doloma brick.

OBJECTS OF THE INVENTION

It is an object of the invention to provide a binder for shaped refractory.

It is another object of the invention to provide a low water and doloma mixture having sufficient green strength.

It is another object of the invention to provide a cured and coked doloma-containing shaped article having increased strength relative to prior art doloma-containing shaped articles.

It is another object of the invention to provide a method for making a binder containing low levels of water, for shaped refractory.

It is another object of the invention to provide a method for making a low water and doloma mixture having sufficient green strength.

It is another object of the invention to provide a method for making a cured and coked doloma-containing shaped article having increased strength relative to prior art doloma-containing shaped articles.

SUMMARY OF THE INVENTION

This invention relates to a binder for intimate mixing with a refractory aggregate. Typically, the refractory contains doloma. The novel binder comprises phenolic novolak resin, a chemical agent, a solvent, such as furfuryl alcohol, and preferably "low levels" of water. Low levels being defined as about 0.2 to about 1.5 weight percent water, instead of 2 to 3 weight percent water as in the above-mentioned prior art. The decreased water quantity provides coked doloma products having greater strength than those of the prior art which use the higher quantity of water. Water in the prior art, helped to develop the green strength of an intermediate product, i.e., the green body, and made it workable, e.g., made mixing easy. Preferred embodiments of the present invention compensate for the decreased amount of water by employing the chemical agents. The chemical agents together with the smaller quantity of water provide green strength and workability of the intermediate products which are about equivalent to that prepared from higher water-containing prior art compositions. However, the strength of the final cured and coked product of the present invention is greater. The novel binder also comprises up to about 4 weight percent of a phenol.

The chemical agent is selected from amines other than hexamethylene tetramine (HEXA), having 1 to 5 (preferably 2 to 4) nitrogen atoms, formamide, (lower) alkoxymethylated melamine-formaldehyde resin, glycerine, 1, 3-alkyl diol having 3 to 6 carbon atoms or a chloride soluble in the binder. The amine-containing chemical agents are optionally at least partially neutralized by an acid.

Typically, the binder is sent by its manufacturer to a customer. The customer mixes the binder, aggregate and, a curing agent and then shapes the mixture into bricks. The shaped bricks are "green bodies." These green bodies are subsequently cured and coked.

Ordinarily, the binder manufacturer does not add curing agents, e.g. HEXA, to the binder because this would reduce storage life of the binder. However, where the binder contains the alkoxylated melamine-formaldehyde resin, the melamine resin may act as a chemical agent (to enhance green strength) at ambient temperature and a curing agent at higher temperature. This binder is especially easy to use because the melamine resin is a high temperature (above about 170° C.) curing agent. Thus, it is stable, i.e., non-curing, at ambient storage temperature.

The present invention has the advantages of avoiding premature hardening of the doloma-binder green mixture, having adequate green strength prior to coking while employing unexpectedly low levels of water, and unexpectedly improving the modulus of rupture of the doloma brick after curing and coking.

DETAILED DESCRIPTION OF THE INVENTION

The Phenolic Resin

Novolak resins are obtained by the reaction of a phenol and an aldehyde in a strongly acidic pH region. Suitable catalysts include the strong mineral acids such as sulfuric acid, phosphoric acid and hydrochloric acid as well as organic acid catalysts such as oxalic acid, para-toluenesulfonic acid, and inorganic salts such as zinc acetate, or zinc borate. The phenol is preferably phenol itself, but a portion of the phenol can be substituted with cresols, xylenols, alkyl substituted phenols such as ethyl phenol, propyl phenol and mixtures thereof. The aldehyde is preferably formaldehyde, but other aldehydes such as acetaldehyde, benzaldehyde and furfural can also be used to partially or totally replace the formaldehyde.

The reaction of the aldehyde and phenol is carried out at the molar ratio of 1 mole of the phenol to about 0.40 to about 0.85 moles of the aldehyde. For practical purposes, phenolic novolaks do not harden upon heating, but remain soluble and fusible unless a hardener (curing agent) is present.

In curing a novolak resin, a curing agent is used such as a formaldehyde, HEXA, or a melamine resin to overcome the deficiency of alkylene-bridging groups to convert the resin to an insoluble infusible condition. The novolaks employed in this invention are generally solids such as in the form of a flake, powder, etc. The molecular weight of the novolak will vary from about 500 to 12,000, preferably 2,000 to 8,000 depending on their intended use. As used in this disclosure, molecular weight (M.W.) is weight average molecular weight. It can be advantageous to use a blend of high molecular weight (M.W.) novolak, e.g., at least 5,000, and low M.W. novolak, e.g., about 1,000, blended at a 5:1 to 1:1 weight ratio of high to low M.W. novolaks.

When a doloma refractory, or other refractory, is used with binders of the present invention, the quantity of novolak supplied by the binder can vary over a broad range sufficient to bind the refractory on curing of the novolak. Generally, the novolak is present in an amount equal to about 3 to about 10 weight percent of the particulate refractory, and preferably about 3 to about 5 weight percent of the particulate refractory.

The Refractory Aggregate

In preferred embodiments, the present invention employs conventional refractory aggregates of doloma (calcined dolomite) for use in formed bricks. The free aggregate employed to form doloma bricks has a particle size of about ¼ inch to about 325 mesh (U.S. Standard Testing screen number) powder. In addition to, or as an alternative to doloma, refractory aggregate such as silica, e.g., quartz, particularly when used with silica fume, magnesia, particularly when used with lightburned magnesia, alumina, zirconia, or chrome ore, e.g., chromite sand, and mixtures thereof may be employed with the binder of the present invention.

The Chemical Agents

The chemical agents of this invention are employed in an amount which is sufficient to increase green strength of a pressed green body, e.g., pressed brick, to a level of about 30 to about 50 psi for the mixture of resin and aggregate. Typically, this is about 0.5 to about 5, preferably about 1 to about 3, weight percent of the binder except as listed below. Achieving high green strength is different from curing. Green strength is a measure of solidification or rigidity whereas curing means chemical linking, i.e., making the resin infusible.

Suitable chemical agents include amines, other than HEXA, having 1 to 5 nitrogen atoms, preferably having 2 to 4 nitrogen atoms. Such amines include monoamines and polyamines. Representative monoamines include ethanolamine, propanolamine, benzylamine, dialxylaminomethylphenil cyclohexylamine, piperidine, and their N-alkylated mono- and di-alkylated derivatives where alkyl is of one to four carbon atoms, but preferably alkyl is of one to two carbon atoms. Representative polyamines include poly(dialkylaminomethyl) substituted phenols, poly (dialkylaminomethyl) substituted bisphenols, and poly (dialkylaminomethyl) substituted polyphenols, preferably 2, 4, 6-tris (dimethylaminomethyl) phenol or 2, 2', 6, 6'-tetra (dimethylaminomethyl) bisphenol A. Such amines also include N, N, N', N'-tetra alkyl substituted diamines having an alkylene group of 2 to 6 carbon atoms between its nitrogen atoms, triethylene diamine, piperazine, ethylene diamine, poly(ethylene amines) such as diethylene triamine, 1, 3, 5-trialkyl hexahydro-s-triazines such as 1, 3, 5-trimethyl hexahydro-s-triazine, and (lower) alkoxymethylated melamine-formaldehyde resin. Unless specified otherwise, the term "alkyl" is defined as an alkyl having 1 to 4 carbon atoms, preferred alkyls are those having 1 to 2 carbon atoms.

Although HEXA is not a chemical agent, it may subsequently be added as a curing agent as explained below in the disclosure of curing agents. Other suitable chemical agents include formamide, glycerin (which is 1, 2, 3-trihydroxypropane), 1, 3-alkyldiol having 3 to 6 carbon atoms such as 1, 3-propanediol, or a chloride soluble in the binder, such as lithium chloride or choline chloride.

Mixtures of two or more of these chemical agents may also be employed. For example, the chemical agent may comprise a first agent selected from poly (dialkylaminomethyl) substituted phenol, poly (dialkylaminomethyl) substituted bisphenol, poly (dialkylaminomethyl) substituted polyphenol, N, N, N', N'-tetra alkyl substituted diamine having 2 to 10 carbon atoms between its nitrogen atoms, triethylene diamine, piperazine, ethylene diamine, poly(ethylene amines), 1, 3, 5-trialkyl hexahydro-s-triazines, tetramethyl guanidine, (lower) alkoxymethylated melamine-formaldehyde resin, and mixtures thereof. The first agent may be combined with a second agent selected from glycerine, 1, 3-alkyldiol having 3 to 6 carbon atoms, a chloride soluble in the resin, and mixtures thereof. A preferred embodiment of this invention employs from about 0.5 to about 2 weight percent 2, 4, 6-tris (dimethylaminomethyl)phenol and about 0.5 to about 2 weight percent glycerin. Where the chemical agent comprises (lower) alkoxymethylated melamine-formaldehyde resin, levels from about 0.5 to about 15 weight percent of this resin may be employed. The melamine-formaldehyde formaldehyde resins are described in more detail below in the disclosure of curing agents.

Solvents

The solvent constitutes about 30 to about 60 weight percent of the binder. Furfuryl alcohol, $C_4H_3OCH_2OH$, is the preferred solvent in which to dissolve phenolic novolak when the binder of this invention is employed with doloma. Typically, the solvent comprises a majority amount of furfuryl alcohol and smaller amounts of co-solvents. Up to about 20 weight %, preferably about 2 to about 20 weight %, of the binder may be co-solvent present as part of the solvent. Typical co-solvents are selected from alkyl monohydric alcohols having 6 to 11 carbon atoms, such as octyl alcohol, monohydric cycloalkanes, such as cyclohexanol, monohydric arylalkyl compounds, such as benzyl alcohol, as well as monoethers and diethers of glycols, monoethers and diethers of polyglycols, diesters of dicarboxylic acids, preferably dimethylesters of alkanedioic acids of 4 to 6 carbon atoms such as succinic, glutaric, and adipic acids, as well as mixtures of these co-solvents. Unless otherwise indicated, the term "weight %" in the present disclosure, for components of the novolak-containing solution, is defined as weight % of the total solution including novolak polymer. Simple glycols such as 1, 2 glycols, e.g., ethylene glycol are unsuitable because they may adversely affect mix rheology of doloma or decrease mix work life. As disclosed in U.S. Pat. No. 4,795,725, the solvent of its resin for binding refractory bricks of CaO—containing burned dolomite should be more unlike water than these glycols. That is, the hydroxy groups should not be on adjacent carbon atoms.

However, solvents such as glycols, e.g., ethylene glycol, propylene glycol, or mixtures thereof may be employed instead of furfuryl alcohol in binders for aggregates other than doloma.

Curing Agents

Optimum performance during refractory service necessitates curing the resin prior to coking. Coking may be carried out at about 1000° centigrade and above. Typically, to achieve curing, curing agents are added during the manufacture of doloma brick. From about 5 to about 15 weight percent (based on weight of novolak resin) of these curing agents may be added to the furfuryl alcohol solution. Conventional novolak curing agents known in the art may be employed. Conventional curing agents include hexamethylenetetramine ("HEXA"), tris(hydroxymethyl) nitromethane, or (lower) alkoxymethylated melamineformaldehyde resins.

HEXA is employed at about 7 to about 12 weight percent based on novolak solids. The tris(hydroxymethyl) nitromethane is typically used at levels of about 7 to 12 weight percent, whereas the melamine resins (when employed as curing agents) are employed at levels of about 5 to about 15, preferably about 8 to about 12, weight percent based on novolak solid weight. Combinations of the curing agents may also be employed.

Unlike HEXA, the melamine-formaldehyde resins (i) require higher temperature to cure the novolak resin, and (ii) they are both chemical agents (to improve green strength) and curing agents. In these melamine-formaldehyde resins, at least 50% of the cure is accomplished above 170° C. This minimizes hardening and solidification of the binder in heated equipment and provides prolonged mix life for the binder. Thus, a readily curable mixture of melamine-formaldehyde resin and novolak resin can be sent to a customer and the customer need not add curing agent when he mixes the novolak resin and doloma aggregate.

The melamine-formaldehyde resins are triazines containing from about 1 to 2.5 melamine rings per molecule. These melamine-formaldehyde resins are prepared from melamine and formaldehyde with a formaldehyde/melamine molar ratio of at least 4.

These formaldehyde resins are subsequently alkoxylated with (lower) alkoxy groups, i.e., having from 1 to 6 and preferably 1 to 4 carbon atoms. The (lower) alkoxymethylated melamine-formaldehyde resins, can have a degree of polymerization of from about 1 to about 2.5 and preferably about 1.3 to 2.2. The degree of polymerization (D.P.) is the average number of triazine rings per molecule.

An idealized formula for a class of (lower) alkoxymethylated melamine-formaldehyde resins of the present invention wherein the degree of polymerization is one or two is set forth in the formula below.

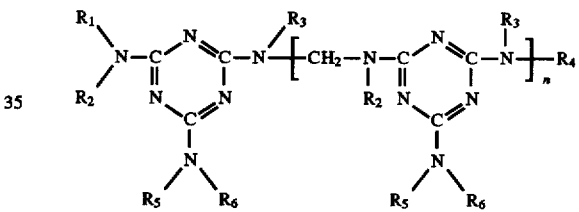

wherein each of $R_1$, $R_2$, $R_3$, $R_4$, $R_5$ and $R_6$ is hydrogen, methylol (—$CH_2OH$) or (lower) alkoxymethyl, i.e., having 1 to 6 carbon atoms in the alkoxy group, and preferably 1 to 4 carbon atoms in such group; and n is 0 or 1. At least two of the R groups are selected from alkoxy and methylol. Thus, the amounts of alkoxy and methylol are sufficient to achieve curing when the melamine resins are employed as curing agents.

Commercial sources of melamine resins are now available which include CYMEL 303, CYMEL 1168, and RESIMENE 751. CYMEL 303 is a (lower) alkoxylated melamine-formaldehyde resin of Cytec Industries of Stamford, Connecticut. It has approximately a D.P. of 1.75 and about 5.6 methoxymethyl groups per triazine ring and about 1.5% of methylol content. CYMEL 1168 is also a (lower) alkoxylated melamine-formaldehyde resin of Cytec Industries of Stamford, Connecticut. It has an approximate D.P. of 1.7 with about 5.6 alkoxymethyl groups per triazine ring, wherein the number of methoxymethyl and isobutoxymethyl are about equal. RESIMENE 751 is a (lower) alkoxylated melamine-formaldehyde resin of Monsanto Company having an approximate D.P. of about 1.1 with about 2.9 methoxymethyl groups and 2.6 butoxymethyl groups per triazine ring.

Resin Binder System

The binders are novolak resin-containing solutions characterized by a viscosity of about 1,000 to about 10,000 centipoise at 25° C., preferably about 2,000 to about 4,000 centipoise. The phenolic novolak resin is dissolved in solvent. The solution contains about 40 to about 70 weight percent novolak resin and about 30 to about 60 weight percent solvent. When the binder is employed to bind doloma, the solvent is primarily furfuryl alcohol and smaller amounts of co-solvent may be present as disclosed above. The solution typically comprises about 0.5 to about 5, preferably about 1 to about 3, weight percent of the chemical agents. However, where the chemical agent is (lower) alkoxymethylated melamine-formaldehyde resin, the solution may comprise from about 0.5 to about 15 weight percent melamine-formaldehyde resin, (based on weight of the novolak resin) because the melamine-formaldehyde resin may also be employed as a curing agent.

The binder may contain about 0.2 to about 10 weight percent water. However, when the binder is employed to bind doloma, the binder will preferably contain about 0.2 to about 1.5, more preferably about 0.2 to about 1.0, most preferably about 0.3 to about 0.7, weight percent total water. Usually, the binder has up to about 4 weight percent total phenolic monomer. The binder may contain up to about ten weight percent water when the binder is provided for binding aggregates other than doloma and includes (i) chemical agents other than monoamines, or (ii) mixtures of chemical agents which are monoamines and chemical agents other than monoamines. However, the aforementioned lower water levels are preferred even for the embodiments which do not contain doloma.

The solution may optionally incorporate acids to partially or completely neutralize amine-containing chemical agents. The acid is employed to reduce binder solution viscosity when an amine is present. The acid may also improve green strength of the doloma-binder mixture. Typical acids include acetic acid, formic acid, glycolic acid, lactic acid, adipic acid, succinic acid, trimellitic acid (1, 2, 4-benzenetricarboxylic acid), sulfanilic acid (4-aminobenzenesulfonic acid), sulfamic acid, benzenesulfonic acid, naphthalenesulfonic acid, methanesulfonic acid, phenolsulfonic acid, nitric acid, hydrogen chloride and toluenesulfonic acid. Formic acid is preferred. However, care must be taken to keep the binder at a pH of about 4 or above, preferably between about 4.5 and about 8. Otherwise, acid catalysis of the furfuryl alcohol solvent may take place and prematurely harden the binder.

It is noted that United Kingdom Patent Application GB 2,131,789 to Richard et al discloses a binder for calcined dolomite compositions which employs phenol-formaldehyde resin and alkali metal hydroxide. In contrast, the present invention need not employ alkali metal hydroxide.

The solutions of phenolic novolak and furfuryl alcohol can be used alone or with the addition of novolak powder in the manufacture of doloma (calcined dolomite)-based refractory brick. Novolak powder is preferably used when the viscosity of the furfuryl alcohol solution is below 2000 centipoise at 25° C. The level of added powder can vary from about 10 weight percent to about 20 weight percent based on solution weight.

Prior art binders comprising phenolic novolaks in furfuryl alcohol are typically characterized as follows:

Viscosity: 2800–3500 centipoise at 25° C.
Solids: 48–55 weight percent
Water: 2.0–3.0 weight percent
Phenol: 0.0–3.0 weight percent.

A typical initial mole ratio to prepare phenolic novolak resin is a formaldehyde to phenol mole ratio of about 0.82:1.

With conventional phenol novolak in furfuryl alcohol, lower levels of water decrease the green strength of ambient temperature pressed doloma/resin brick. Higher levels of water decrease the mix life of the brick mix. As compared to prior art pressed doloma brick, the present invention achieves (i) binder aggregate mixtures having desirable mix work life, and (ii) pressed doloma bricks having essentially equal room temperature green strength. Also, compared to conventional pressed doloma brick, doloma bricks bound by the binders of the present invention unexpectedly provide up to about 50% higher modulus of rupture (at room temperature) after coking, i.e., carbonizing at temperatures of about 1000° centigrade and above.

Use of the Resin Binder System

Typically, the resin solution, i.e., binder, of the present invention is used as follows. The resin solution is made of the novolak resin dissolved in furfuryl alcohol as well as the other components such as chemical agents, co-solvents and optional acids as listed above. Melamine-formaldehyde resins as heat activatable curing agents may also be added. The resin solution is sent to a brick manufacturer. The brick manufacturer mixes the resin solution with the doloma (or dolomite) aggregate and a curing agent (if sufficient curing agent was not previously added) and then presses the mixture to make bricks. The bricks then cure at elevated temperature depending on the curing agent. The elevated temperature also drives off organic volatiles in the bricks.

In the alternative, the binder may be shipped to the brick manufacturer with a zero level or low (at most 2 weight percent) level of chemical agent. Then the brick manufacturer would add the binder (as shipped), chemical agent, and curing agent to the doloma aggregate.

That those skilled in the art may more fully understand the invention presented herein, the following procedures and non-limiting Examples are set forth. All parts and percentages in the Examples as well as elsewhere in this application are by weight unless the context indicates otherwise. Room temperature means about 75° F. (24° C.) to 77° F. (25° C.).

EXAMPLES

Procedure for Determining Effect of Additives on Binder/Doloma Aggregate Mixes

The following Examples 1–45 show the results of mixing the novolaks, furfuryl alcohol and other ingredients of the binders of present invention. The binder is made by adding triethanolamine (TEA) to the furfuryl alcohol, the furfuryl alcohol being at about 25 to 30° C., to form a solution of about 0.5 weight percent TEA. The solution is then heated and the novolak solids added while the solution is at a temperature from about 65 to about 85° C. to dissolve the novolak solids. The other ingredients listed on TABLE 1 are added to the solution at room temperature or at elevated temperatures up to about 80° C. Then, the resin-containing solution cools to room temperature.

A formulation of 15 grams of ball milled doloma fines (powder) and 60 grams of coarse (plus 60 mesh) doloma was weighed and premixed in a paper cup. The doloma aggregate was then placed in a desiccator until ready to use. The cup containing the sample was removed from the desiccator and 4 grams of resin weighed into the cup directly on the doloma to form a mixture. The doloma/resin mixture was hand mixed thoroughly for 2–3 minutes at room temperature.

The rheology, wetness and appearance of the mixture was then observed. At 15 minutes, 30 grams of the mixture was pressed into a 50 milliliter plastic beaker. At 45 minutes, the remainder was pressed into a second 50 milliliter plastic beaker. The samples were examined for crumbling, cohesiveness, wetness and any other noticeable characteristics at 3 hours and after an overnight period of about 24 hours.

The following formulations were hand mixed and tested. The formulations are disclosed on TABLE 1. The results of these tests are disclosed by TABLE 2 below.

In TABLE 1, the compositions of the formulations are expressed as parts of total formulation, e.g., about 50 parts novolak, about 50 parts furfuryl alcohol, and about 1 to 4 parts miscellaneous. Also in TABLE 1, DMP/K54 is commercial grade, technical for 2, 4, 6-tris (dimethylaminomethyl) phenol, e.g., ANCAMINE K54, sold by Air Products and Chemicals Co., Allentown, Pennsylvania. Unless indicated otherwise, the resins of TABLE 1 employ phenolic novolak with a cone and plate viscosity of about 1100 centipoise as measured at 175° C., and free phenol contents of about 3.0–3.6 weight %. Generally, viscosities of the novolak resin solutions in TABLE 1 were about 3000 to about 4000 centipoise. Brookfield viscosity, measured at 20 rpm and 25° C. ±0.1° C. However, Examples 9, 13 and 36 were exceptions which had viscosities of about 2400 to about 2800 centipoise. Water in the binders of TABLE 1 was about 0.4 weight % ±0.05%. Weight percent water was determined by Karl Fisher titration.

TABLE I

| EX. | FURFURAL ALCOHOL | NOVOLAK | GLYCERINE | DMP/ K54 | FORMIC ACID | ETHYLENE GLYCOL | OTHER ADDITIVES |
|---|---|---|---|---|---|---|---|
| 1 | 49 | 51 | | | | | |
| 2 | 50 | 50 | 1 | | | 3 | |
| 3 | 51 | 49 | | | | | 1.5 parts acetyl acetone |
| 4 | 51 | 49 | | 1 | 0.5 | | |
| 5 | 51 | 49 | | 1 | | | 0.5 part acetic acid |
| 6 | 49 | 51 | | | | | |
| 7 | 51 | 49 | | 1 | 0.5 | | |
| 8 | 51 | 48 | | 1 | 0.25 | | 1.5 parts phenol |
| 9 | 47 | 48 | 1 | | | 2 | 1.5 parts phenol |
| 10 | *49 | 43 | 0.5 | 0.5 | 0.125 | 1 | 1.5 parts phenol |
| 11 | ** | | | | | | |
| 12 | *49 | 48 | 0.5 | 0.5 | 0.125 | | 1.5 parts phenol |
| 13 | 51 | 47 | 1 | 1 | 0.25 | 1.5 | 1.5 parts phenol |
| 14 | 49 | 46 | 1 | 0.75 | 0.2 | 2 | 1.5 parts phenol |
| 15 | 51 | 49 | 0.5 | 0.5 | 0.125 | | |
| 16 | 51 | 49 | 0.5 | 0.5 | 0.125 | 1 | 1 part 2-pyrrolidinone |
| 17 | 51 | 49 | 0.5 | 0.5 | 0.125 | 4 | 1 part 1-methyl-2-pyrrolidinone |
| 18 | ** | | | | | | |
| 19 | *49 | 48 | 0.5 | 0.5 | 0.125 | 1 | 1.5 parts phenol |
| 20 | 51 | 49 | 1 | 1 | 0.25 | 2 | |
| 21 | 51 | 49 | 1 | 1 | 0.25 | 2 | 1.5 parts phenol |
| 22 | 51 | 49 | 1 | 1 | 0.25 | 2 | |
| 23 | 51 | 49 | 1 | 1 | 0.25 | | |
| 24 | 52 | 48 | 1 | 1 | 0.25 | | |
| 25 | 52 | 48 | 1 | 1 | 0.25 | | 0.5 part choline chloride (70%) |
| 26 | 52 | 48 | 1 | 1 | 0.25 | | |
| 27 | 52 | 48 | 1 | 1 | 0.25 | | 0.25 part choline chloride (70%) |
| 28 | 52 | 48 | 1 | 1.5 | 0.375 | | |
| 29 | 51 | 49 | 1.3 | 1.3 | 0.325 | | |
| 30 | 51 | 49 | 1.3 | | 0.325 | | 1.3 parts triethylene diamine |
| 31 | 51 | 49 | 1.3 | | 0.325 | | 1.3 parts piperazine |
| 32 | 51 | 49 | 1.3 | | 0.325 | | 1.3 parts N, N, N', N'-tetramethyl-1,3-propanediamine |
| 33 | 51 | 49 | 1.3 | | 0.325 | | 1.3 parts 1, 3, 5-trimethyl hexahydro-s-triazine |
| 34 | 51 | 49 | 1.3 | | 0.325 | | 1.3 parts diethylenetriamine |
| 35 | 51 | 49 | 1.3 | | 0.325 | | 1.3 parts ethylene diamine |
| 36 | 51 | 49 | 1.3 | | 0.325 | | 1.3 parts formamide |
| 37 | 51 | 49 | 1.3 | 1.3 | 0.325 | | |
| 38 | 51 | 49 | | 1.3 | 0.325 | | 1.3 parts 1, 3-propanediol |
| 39 | 51 | 49 | | 1.3 | 0.325 | | |
| 40 | 51 | 49 | 1.3 | 1.3 | 0.325 | | |
| 41 | 51 | 49 | 1.3 | | 0.325 | | 1.3 parts Cymel 303 |
| 42 | 51 | 49 | 1.3 | | 0.325 | | 1.3 parts Cymel 1168 |

TABLE I-continued

| EX. | FURFURAL ALCOHOL | NOVOLAK | GLYCERINE | DMP/ K54 | FORMIC ACID | ETHYLENE GLYCOL | OTHER ADDITIVES |
|---|---|---|---|---|---|---|---|
| 43 | 51 | 48 | 1.3 | | 0.325 | | 1.3 parts monoethanol amine |
| 44 | 51 | 48 | 1.3 | | 0.325 | | 1.3 parts N, N-dimethyl benzylamine |
| 45 | 51 | 48 | 1.3 | 1.3 | 0.325 | | |

TABLE 2

| EX. | INITIAL WETOUT/ MIX[1] | MIXING AT 15 MIN. PRESSING[1] | MIXING AT 45 MIN. PRESSING[1] | APPEARANCE AT 3 HOUR EXAMINATION[2] | APPEARANCE AT 24 HOURS[2] | BREAK STRENGTH AT 24 HOURS[3] |
|---|---|---|---|---|---|---|
| 1 | 5 | 5 | 5 | 5 | 4 | 3 |
| 2 | 6 | 6 | 6 | 4 | 5 | 4 |
| 3 | 2 | 2 | 2 | 2 | 2 | 2 |
| 4 | 4 | 4 | 4 | 6 | 6 | 5 |
| 5 | 3 | 3 | 3 | 4 | 6 | 5 |
| 6 | 3 | 3 | 3 | 6 | 7 | 6 |
| 7 | 4 | 3 | 4 | 5 | 6 | 5 |
| 8 | 4 | 4 | 4 | 5 | 6 | 5 |
| 9 | 3 | 4 | 4 | 5 | 5 | 6 |
| 10 | 4 | 4 | 3 | 6 | 6 | 7 |
| 11 | 9 | 9 | 9 | 4 | 4 | 4 |
| 12 | 6 | 6 | 6 | 4 | 4 | 4 |
| 13 | 5 | 5 | 5 | 5 | 5 | 5 |
| 14 | 4 | 4 | 4 | 3 | 4 | 3 |
| 15 | 5 | 5 | 5 | 4 | 5 | 4 |
| 16 | 5 | 5 | 5 | 4 | 5 | 4 |
| 17 | 5 | 5 | 5 | 4 | 5 | 4 |
| 18 | 9 | 9 | 9 | 4 | 5 | 3 |
| 19 | 6 | 6 | 6 | 6 | 5 | 4 |
| 20 | 5 | 5 | 5 | 4 | 5 | 5 |
| 21 | 4 | 4 | 4 | 5 | 5 | 5 |
| 22 | 5 | 5 | 5 | 4 | 5 | 5 |
| 23 | 7 | 7 | 7 | 6 | 5 | 6 |
| 24 | 7 | 7 | 7 | 6 | 5 | 6 |
| 25 | 8 | 6 | 6 | 3 | 2 | 2 |
| 26 | 7 | 7 | 7 | 6 | 5 | 6 |
| 27 | 6 | 6 | 6 | 6 | 5 | 6 |
| 28 | 8 | 7 | 7 | 6 | 6 | 6 |
| 29 | 5 | 5 | 5 | 6 | 6 | 6 |
| 30 | 7 | 6 | 6 | 6 | 6 | 7 |
| 31 | 6 | 6 | 6 | 6 | 6 | 6 |
| 32 | 6 | 6 | 6 | 6 | 6 | 6 |
| 33 | 7 | 6 | 6 | 6 | 6 | 6 |
| 34 | 6 | 6 | 6 | 6 | 6 | 6 |
| 35 | 7 | 6 | 6 | 6 | 6 | 6 |
| 36 | 6 | 6 | 6 | 6 | 6 | 6 |
| 37 | 5 | 5 | 5 | 6 | 6 | 6 |
| 38 | 5 | 5 | 5 | 6 | 7 | 8 |
| 39 | 6 | 6 | 6 | 6 | 7 | 9 |
| 40 | 5 | 5 | 5 | 6 | 6 | 6 |
| 41 | 4 | 5 | 5 | 6 | 6 | 6 |
| 42 | 4 | 5 | 5 | 6 | 6 | 6 |
| 43 | 6 | 5 | 5 | 6 | 6 | 6 |
| 44 | 5 | 5 | 5 | 6 | 6 | 6 |
| 45 | 5 | 5 | 5 | 6 | 6 | 6 |

KEY:
* 50/50 Blend of Examples 8 and 9
** Comparative Example: "Standard" Binder, which contains furfuryl alcohol solvent, novolak, 2.5 weight % water, 1.5 weight % phenol, and 52 weight % solids. The resin has a viscosity of 3150 centipoise at 25° C.. It is submitted that such a resin is representative of resin currently employed in industry to bind dolomite.
[1] wetting/mixing reported on a scale of 1–10:
10 = Wetter, fluffier with low agglomeration and easy to turn over/mix
5 = slower/harder to turn over/mix, with some agglomeration
1 = hard to mix; poor wet out, dry appearance
[2] appearance reported on a scale of 1–10:
10 = firm, minimal crumble
5 = firm, some crumble
1 = softened, crumbly
[3] break strength reported on a scale of 1–10:

TABLE 2-continued

| EX. | INITIAL WETOUT/ MIX[1] | MIXING AT 15 MIN. PRESSING[1] | MIXING AT 45 MIN. PRESSING[1] | APPEARANCE AT 3 HOUR EXAMINATION[2] | APPEARANCE AT 24 HOURS[2] | BREAK STRENGTH AT 24 HOURS[3] |
|---|---|---|---|---|---|---|

10 = firm, hard to break
5 = firm, softer to break
1 = firm, softer to break and crumbly In view of the above data, Example 2 shows addition of both glycerin and glycol is slightly better than the no additive mixture of Example 1. Example 4 shows addition of formic acid results in slightly better performance than addition of acetic acid as in Example 5. Example 3 shows that addition of acetylacetone significantly decreases performance relative to the binder of Example 1. U.S. Pat. No. 5,218,010 to Gerber, incorporated herein by reference in its entirety, discloses acetylacetone (2,4-pentanedione) is an accelerator for hardening of a phenolic resole in the presence of an organic ester and magnesium oxide.

Examples 4 and 5 show addition of DMP/K54 decreases wetting, but increases the ratings for overnight appearance and overnight break strength of Examples 6–10. Example 10, which is a mixture of the resins of Examples 8 and 9 and thus has both DMP/K54 and glycerine, has the best break strength. This synergistic effect is unexpected.

Example 11 shows a "standard" binder (a comparative example) has the best initial wetting/mixing. However, Example 13 shows better appearance after 3 hours, better overnight appearance and better overnight strength than does Example 11. Example 13 contains higher levels of DMP/K54 and glycerin. Example 14 shows poor results. Example 14 has a lower level of DMP/K-54 and a higher level of phenol relative to Example 13. Comparison of Example 15 with Examples 16 and 17, shows that addition of the amides of Examples 16 and 17 has no effect relative to having no amides (Example 15). Thus, unlike formamide and amines of the present invention, the amides of Examples 16 and 17 do not improve the measured properties of the binders.

Example 18 shows that its "standard" binder had better initial wetting and mixing compared to the binder of Examples 19–21 which contained DMP/K54, glycerin, and ethylene glycol. However, Example 18 shows very little difference in performance after three hours or after a overnight period when compared to Examples 19–21. In contrast the above mentioned comparison of Examples 11 (the "standard") and 13 (with DMP/K54 and glycerine) shows the benefits of including DMP/K54 and glycerine. Thus, ethylene glycol appears to counteract the benefits of DMP/K54 and glycerine. Comparison of Example 22 (with ethylene glycol) and Example 23 (without ethylene glycol) confirms that incorporation of ethylene glycol is detrimental to early and later performance.

Comparison of Examples 24 and 25 shows incorporation of 0.5 weight % of choline chloride (Example 25) causes a significant decrease in performance after three hours and after the overnight period. Chloride salts are known strong accelerators for the hardening of phenolic resoles in the presence of organic ester and magnesium oxide according to U.S. Pat. No. 5,294,649 to Gerber, incorporated herein by reference in its entirety. Comparison of Examples 26 and 28 shows that an increase in DMP/K54 and formic acid improves performance. Comparison of Examples 26 and 27 shows addition of 0.25 weight % choline chloride (Example 27) causes a slight decrease in performance. However, choline chloride may be decreasing performance merely due to the high levels of DMP/K54 and glycerine also present.

Example 29 employs DMP/K54. Examples 30–35 replace DMP/K54 with other di-and tri-amines. Example 36 replaces DMP/K54 with formamide. Comparison of these Examples shows that the substitutions have little or no effect in performance after three hours or after the overnight period. However, the replacement slightly increases performance after 15 minute and 45 minute periods.

Comparison of Example 38, which included DMP/K54 and 1,3-propanediol, and Example 39, which included DMP/K54, shows that the 1,3-propanediol slightly improves properties of the mixture initially, but after a overnight period of 24 hours, the properties are essentially the same. Comparison of Example 37, which included DMP/K54 and glycerine, and Example 39 shows that the glycerine reduces break strength after an overnight period of 24 hours.

Comparison of Examples 37–42 shows that the (lower) alkoxymethylated melamine-formaldehyde resins Cymel 303 and Cymel 1168 are effective chemical agents.

Comparison of Examples 43–45 shows that the monoamines are effective chemical agents.

Green Strength and Modulus of Rupture Achieved By the Present Invention

Mixtures of at least 100 pounds were made to include doloma, binders of the below listed Examples, and HEXA (as a curing agent). The mixtures included about 4 weight percent binder based on total mixture weight and about 10 weight percent HEXA based on weight of novolak solids. The mixtures were then shaped into the form of bricks to form green bodies. As a result, it was confirmed that these green bodies employing the binders of the present invention had advantageous properties.

The green strength of the resulting doloma aggregate mixed with binder, i.e., green body, is better for aggregate mixed with the binder of Example 10, than that mixed with the binder of Example 8 or Example 9 alone. This is an unexpected synergistic effect. Green strength is determined by measuring the flexural strength of the bonded aggregate. The aggregates bonded with the resins of the following examples have increasing green strength as follows: Example 29>Example 24>Example 10. This reflects increasing amounts of glycerine, DMP/K54 and formic acid. Moreover, the doloma aggregate mixed with the binder of Example 29 has about the same green strength as that mixed with a binder having a composition closely approximating that of Example 11 (the "standard").

After curing and then coking for a number of hours at temperatures of 1000° C. and higher, the modulus of rupture at room temperature of the mixtures of Examples 24 and 29 are up to 50% greater than that of the "standard". Modulus of rupture was measured according to ASTM Test C133, Annual ASTM Index, Vol. 15.01 (1985). This higher modulus of rupture achieved by the present invention is unexpected and very advantageous. It is advantageous because higher modulus of rupture indicates greater strength, and greater strength lends to greater service life.

These results imply that binders employing DMP/K54 amine combined with glycerine are better than employing either ingredient alone. Moreover, the levels of DMP/K54 and glycerine in the binders of Examples 11, 24 and 29 enhance the modulus of rupture relative to the water-containing "standard" binder.

Silica Aggregates Bound By Resin With and Without Chemical Agents

Example 46

A first mixture of 80 grams of a 90:10 weight ratio blend of coarse sand (Industrial Grade #10, manufactured by Vulcan Materials Co.) and silica fume (grade EMS 983U; manufactured by Elkem Chemicals, Inc.) was mixed with 4 grams of the binder of Example 45. A second mixture of 80 grams of the aforementioned sand mixture was mixed with 4 grams of a binder having the composition of that of Example 45, but lacking DMP/K54, glycerine and formic acid.

Each sample was hand mixed thoroughly for 2 to 3 minutes at room temperature. Then each sample was pressed to form a disc of about 41 grams. Both samples wet easily. After 24 hours, the sample with the chemical agents showed greater cohesiveness than the sample without the chemical agents.

While the invention has been described in conjunction with the specific embodiments thereof, it is evident that many alternatives, modifications, and variations will be apparent to those skilled in the art in light of the foregoing description. Accordingly, it is intended to include all such alternatives, modifications and variations as set forth within the spirit and scope of the appended Claims.

What is claimed is:

1. A composition comprising:
  a binder comprising:
    (i) a solvent;
    (ii) a phenolic novolak resin dissolved in the solvent; and
    (iii) a chemical agent for improving green strength of a doloma aggregate-containing green body bound by the binder,
  wherein the chemical agent is selected from the group consisting of poly(dialkylaminomethyl) substituted phenol, poly(dialkylaminomethyl) substituted bisphenol, poly(dialkylaminomethyl) substituted polyphenol, N, N, N', N'-tetra alkyl substituted diamine having an alkylene group of 2 to 6 carbon atoms between its nitrogen atoms, triethylene diamine, tiperazine, ethylene diamine, poly(ethylene amines), 1, 3, 5-trialkyl hexahydro-s-triazines, formamide, (lower) alkoxymethylated melamine-formaldehyde resin, tetramethyl guanidine, glycerine, 1, 3-alkyldiol having 3 to 6 carbon atoms, a chloride soluble in the binder, and mixtures thereof;
  wherein amine-containing chemical agents are optionally at least partially neutralized by an acid, the binder contains about 0.2 to about 10 weight percent water, and the binder contains up to about 4 weight percent of a phenol, further comprising a doloma-containing refractory aggregate, wherein the binder binds the aggregate.

2. The composition of claim 1, further comprising a curing agent.

3. The composition of claim 2, wherein the novolak resin is present in an amount equal to about 3 to about 10 weight percent of the refractory aggregate, and about 0.5 to about 5 weight percent of the binder is the chemical agent.

4. The composition of claim 2, wherein the composition has been exposed to temperature which carbonized at least a portion of the novolak resin.

5. The composition of claim 4, having the form of a shaped article.

6. The composition of claim 2, further comprising powdered phenolic novolak resin.

7. A method of improving green strength of a mixture of a binder and a refractory aggregate, comprising the step of forming the binder by combining:
  (i) a solvent;
  (ii) the phenolic novolak resin, the resin being a quantity sufficient to bind the aggregate on curing of the resin; and
  (iii) a chemical agent for improving the green strength, wherein the chemical agent is selected from the group consisting of poly(dialkylaminomethyl) substituted phenol, poly(dialkylaminomethyl) substituted bisphenol, poly(dialkyaminomethyl) substituted polyphenol, N, N, N', N'-tetra alkyl substituted diamine having an alkylene group of 2 to 6 carbon atoms between its nitrogen rings, triethylene diamine, piperazine, ethylene diamine, poly(ethylene amines), 1, 3, 5-trialkyl hexahydro-s-triazines, tetramethyl guanidine, (lower) alkoxymethylated melamine-formaldehyde resin, formamide, glycerine, 1, 3-alkyldiol having 3 to 6 carbon atoms, a chloride soluble in the binder, and mixtures thereof;
  wherein the amine-containing chemical agents are optionally at least partially neutralized by an acid; and
  the binder comprises about 0.2 to about 10 weight percent water, and the binder comprises up to 4 weight percent of a phenol.

8. The method of claim 7, further comprising mixing the binder with the aggregate, a curing agent, and optionally powdered phenolic novolak resin, to form the mixture, wherein the aggregate comprises doloma and the binder comprises about 0.2 to about 1.5 weight percent water.

9. The method of claim 7, wherein the chemical agent is a first agent selected from poly(dialkylaminomethyl) substituted phenol, poly(dialkylaminomethyl) substituted bisphenol, poly(dialkylaminomethyl) substituted polyphenol, N, N, N', N'-tetra alkyl substituted diamine, triethylene diamine, piperazine, ethylene diamine, poly (ethylene amines), and 1, 3, 5-trialkyl hexahydro-s-triazine, tetramethyl guanidine, (lower) alkoxymethylated melamine-formaldehyde resin, formamide, and mixtures thereof and optionally a second agent selected from glycerine, 1, 3-alkyldiol having 3 to 6 carbon atoms, a chloride soluble in the binder, and mixtures thereof.

10. The method of claim 7, wherein the chemical agent is a first agent selected from the group consisting of 2, 4, 6-tris (dimethylaminomethyl) phenol, 2, 2', 6, 6'-tetra (dimethylaminomethyl) bisphenol A, and mixtures thereof, and optionally a second agent selected from glycerine, 1, 3-propanediol, and mixtures thereof.

11. The method of claim 7, wherein the chemical agent is (lower) alkoxy methylated melamine-formaldehyde resin.

12. The method of claim 7, wherein the binder comprises about 0.2 to about 1.0 weight percent water.

13. The method of claim 8, wherein the novolak resin is in the mixture in an amount equal to about 3 to about 10 the weight percent of the refractory, and about 0.5% to about 5 weight percent of the binder is the chemical agent.

14. The method of claim 7, wherein the binder comprises about 0.2 to about 1.5 weight percent water, about 30 to about 60 weight percent solvent, and the solvent comprises furfuryl alcohol.

15. The method of claim 14, wherein the solvent comprises a co-solvent selected from the group consisting of alkyl monohydric alcohol having 6 to 11 carbon atoms, cycloalkyl monohydric alcohols, arylalkyl monohydric alcohol, aryl monohydric alcohol, monoethers of glycols, di-ethers of glycols, monoethers of polyglycols, di-ethers of polyglycols, diesters of dicarboxylic acids, and mixtures thereof, and up to 20 weight percent of the binder is the co-solvent.

16. The method of claim 14, wherein the novolak resin is dissolved in the binder and about 40 to about 70 weight percent of the binder is the novolak resin.

17. The method of claim 8, wherein the mixture comprises the curing agent present in an amount equal to about 5 to about 15 weight percent of the novolak resin.

18. The method of claim 7, wherein the binder comprises the acid to maintain a pH of the solution from about 4.5 to about 8.

19. The method of claim 7, wherein the binder comprises formic acid.

20. The method of claim 27, wherein the binder comprises about 0.5 to about 4 weight percent chemical agent and about 0.3 to about 0.7 weight percent water.

21. The method of claim 8, further comprising curing the phenolic novolak resin of the mixture and subjecting the cured resin-containing mixture to temperature sufficient to carbonize at least a majority portion of the cured phenolic novolak resin.

22. A hardened and carbonized composition made by the method of claim 21.

23. A method of improving green strength of a mixture of a phenolic novolak resin and a refractory aggregate, comprising the step of combining:

(i) a solvent;

(ii) the phenolic novolak resin, the resin being a quantity sufficient to bind the aggregate on curing of the resin; and (iii) a chemical agent for improving the green strength; to form a binder solution; the binder solution comprising about 0.2 to about 1.5 weight percent water.

24. The method of claim 23, wherein the chemical agent is selected from the group of amines, other than hexamethylenetetramine, having 1 to 5 nitrogen atoms, (lower) alkoxylated melamine-formaldehyde resin, formamide, glycerine, 1, 3-alkyl diol having 3 to 6 carbon atoms, and a chloride soluble in the binder;

wherein amine-containing chemical agents are optionally at least partially neutralized by an acid, and about 4 weight percent of the binder is a phenol.

* * * * *